United States Patent [19]
Yukuta et al.

[11] 3,941,847
[45] Mar. 2, 1976

[54] ALDEHYDE FUNCTIONAL POLYMERS

[75] Inventors: Toshio Yukuta, Kodaira; Minoru Kojima, Hachioji; Akira Onishi, Kodaira; Shu Kanbara, Tokyo, all of Japan

[73] Assignee: Bridgestone Tire Company Limited, Tokyo, Japan

[22] Filed: Apr. 23, 1973

[21] Appl. No.: 353,839

[30] Foreign Application Priority Data
Apr. 22, 1972  Japan.............................. 47-40728

[52] U.S. Cl. ............................ 260/601 R; 260/2 R
[51] Int. Cl.$^2$......................................... C07D 47/02
[58] Field of Search ................................ 260/601 R

[56] References Cited
UNITED STATES PATENTS
| | | | |
|---|---|---|---|
| 3,145,232 | 8/1964 | Thompson ..................... | 260/604 R |
| 3,392,154 | 7/1968 | Baldwin ............................ | 260/97.5 |

FOREIGN PATENTS OR APPLICATIONS
| | | | |
|---|---|---|---|
| 984,071 | 2/1964 | United Kingdom................ | 260/602 |

OTHER PUBLICATIONS

Carles et al., Can. J. Chem., Vol. 47, No. 7, pp. 1112–1116 (1969).

*Primary Examiner*—Richard J. Gallagher
*Assistant Examiner*—D. B. Springer
*Attorney, Agent, or Firm*—Sughrue, Rothwell, Mion & Zinn

[57] ABSTRACT

Aldehyde functional polymers having a molecular weight of about 500 to 50,000 and containing aldehyde functional groups at both ends and/or on side chains of the molecule are produced by subjecting some of the double bonds in a high polymer containing olefinically unsaturated double bonds to ozone-decomposition by ozone-containing gas and reducing the ozone-decomposition products by means of a trivalent phosphorus compound as a reducing agent into substantially only aldehyde functional groups.

3 Claims, 2 Drawing Figures

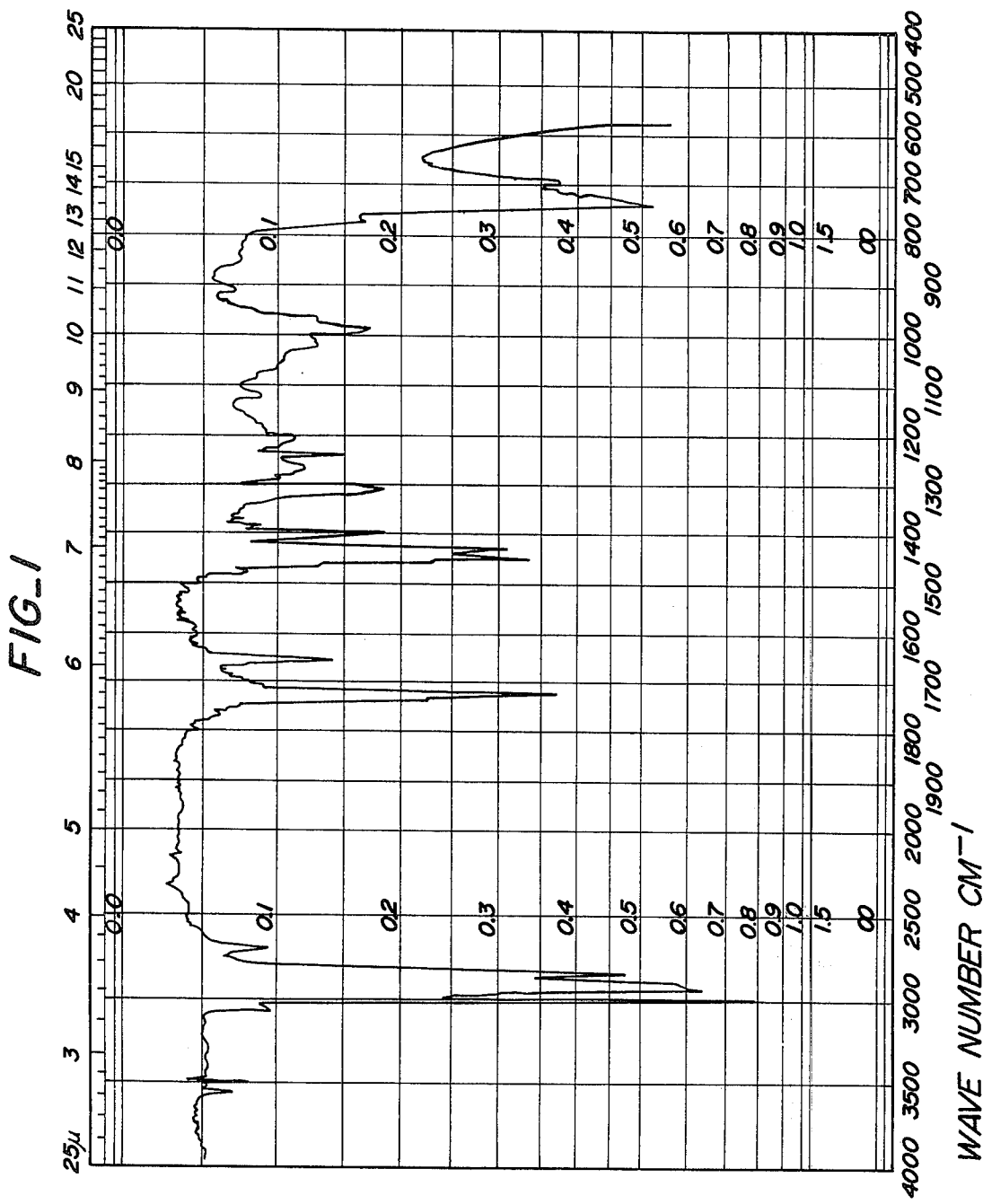
FIG_1

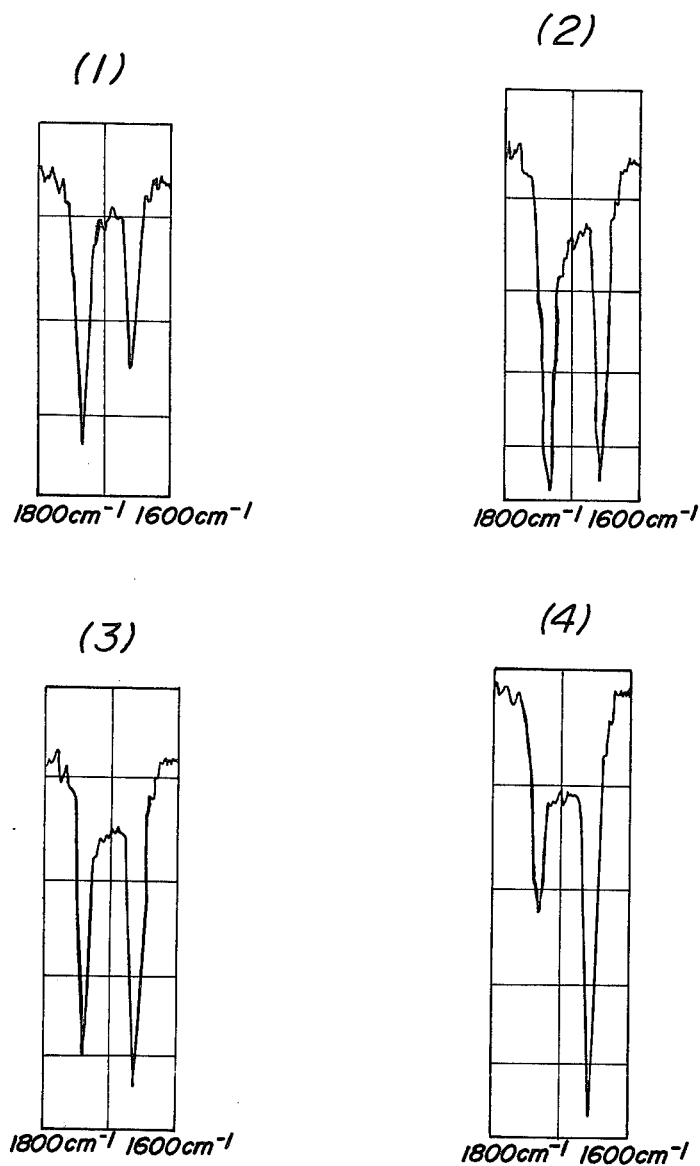
FIG_2

3,941,847

ALDEHYDE FUNCTIONAL POLYMERS

BACKGROUND OF THE INVENTION

1. Field of the Invention

The present invention relates to aldehyde functional group containing polymers and to a method for producing the aldehyde functional group containing polymers having a molecular weight of about 500 to 50,000 and containing aldehyde functional groups at both ends and/or on the side chains of the molecule.

2. Description of the Prior Art

Various methods are known for producing functional polymers having functional groups at both ends and/or on the side chains of the molecule.

For example, polymerizable monomers are subjected to a living polymerization to introduce hydroxyl groups, carboxyl groups, thioalcohol groups and the like into ends of the living polymer, whereby polymers having functional groups at both ends of the molecule are obtained.

On the other hand, methods for producing functional polymers having carboxyl groups or hydroxyl groups at ends of the molecule in which a high polymer having olefinically unsaturated double bonds is reacted with ozone to effect ozone-decomposition of some of the double bonds contained in the high polymer and then the resulting ozone-decomposition products are oxidized or reduced, have been disclosed in U.S. Pat. No. 3,392,154 and British Pat. No. 984,071.

However, no method for producing polymers having only aldehyde functional groups at both ends and/or on the side chains of the polymer molecule is known.

This is because the aldehyde group itself is very unstable and U.S. Pat. No. 3,392,154 for example, has suggested that an aldehyde functional polymer is produced as a reaction intermediate but thereafter this polymer is converted into a carboxyl functional polymer or a hydroxyl functional polymer and it is impossible to recover the aldehyde functional polymer per se.

An object of the present invention is to provide polymers having substantially only aldehyde functional groups at both ends and/or on the side chains of the molecule as the functional group and the present invention has succeeded in the production of aldehyde functional polymers from ozone-decomposition products of high polymers having olefinically unsaturated double bonds after a large number of experiments and studies have been made.

SUMMARY OF THE INVENTION

The present invention comprises a method for producing aldehyde functional polymers having a molecular weight of about 500 to 50,000 and containing aldehyde functional groups terminally and/or on the side chains of the molecule. The method comprises subjecting a homopolymer or a copolymer having a high molecular weight and containing olefinically unsaturated double bonds represented by the general formula of —CH=CH— or $CR_2$=CH— (where R is hydrogen, alkyl group or aryl group) to ozone-decomposition using a mixed gas containing ozone and reducing the resulting products using a trivalent phosphorus compound, as a reducing agent, into only aldehyde functional groups.

According to the present invention, the product obtained by reducing the ozone-decomposition products by means of a trivalent phosphorus compound does not result in a product having carboxyl or hydroxyl functional groups but a stable polymer having substantially all aldehyde groups as the functional groups can be produced in a simple manner.

It is well known that trivalent phosphorus compounds have a reducing activity but it is not known that trivalent phosphorus compounds can be used for the reduction of the ozone-decomposition products of high polymers as in the present invention and that stable aldehyde functional polymers are produced quantitatively by such a reaction. This fact cannot be anticipated from any of the prior arts. Namely, no reducing agents other than trivalent phosphorus compounds provide the aldehyde functional group containing polymer contemplated in the present invention efficiently. For example, in U.S. Pat. No. 3,392,154, the ozone-decomposition products of high polymers are reduced using a tertiary amine, such as pyridine, and the final products are hydroxyl functional polymers or carboxyl functional polymers or the mixtures thereof and it is impossible to recover a polymer containing substantially aldehyde functional groups.

The aldehyde functional polymers obtained in the present invention have elasticity and the reactivity of aldehyde groups contained in the polymer can be utilized effectively. Therefore, the commercial utility of the polymers of this invention is very high. Besides, it may be possible to produce fire-retardant material using these aldehyde polymers with phosphorus compounds present during the manufacturing process.

The aldehyde functional polymers can absorb a certain kind of heavy metal selectively as in an ion exchange resin and further the aldehyde group can react with urea or ammonia generated in a living organism and these polymers can be probably used in therapy of uremia in the biochemical field in the future.

BRIEF DESCRIPTION OF THE DRAWINGS

FIG. 1 is a diagram showing the infrared absorption spectrum of the aldehyde functional polymer of Example 1; and FIG. 2 contains diagrams showing a portion of the infrared absorption spectra of the aldehyde functional polymers of Examples 2, 3, 4 and 5.

DESCRIPTION OF THE PREFERRED EMBODIMENTS

The infrared absorption spectrum of the aldehyde functional polymer obtained in the present invention clearly demonstrates that the functional groups of the polymer of this invention are substantially all aldehyde groups.

In the infrared absorption spectrum in FIG. 1, the absorption due to aldehyde functional groups is observed at 1,730 $cm^{-1}$ and 2,720 $cm^{-1}$ other than the absorption assigned to cis-1,4-polybutadiene of the conjugated diene polymer of the starting substance and the absorption at 1,710 $cm^{-1}$ and 2,650 $cm^{-1}$ peculiar to carboxyl group is so weak as to be negligible. The absorption assigned to the hydroxyl group is not observed.

The ozone-decomposition products show a remarkable absorption at 1,740 $cm^{-1}$ and 1,110 $cm^{-1}$ but in FIG. 1 no absorption at 1,110 $cm^{-1}$ is observed.

FIG. 2 shows the comparison of the absorption at 1,730 $cm^{-1}$ assigned to the aldehyde functional group with the absorption at 1,655 $cm^{-1}$ assigned to cis-1,4-double bond of the starting substance. From FIG. 2 it can be seen that the molecular weight of the resulting aldehyde functional polymer can be freely controlled by varying the degree of ozone-decomposition.

The polymers to be subjected to the ozone-decomposition according to the present invention are homopolymers or copolymers having a high molecular weight and containing olefinically unsaturated double bonds represented by the general formula —CH=CH— or $CR_2$=CH— (where R is hydrogen, alkyl group or aryl group). Suitable monomers for the polymer are conjugated diene monomers having 4-8 carbon atoms. Butadiene and isoprene are preferable. As monomers other than conjugated diene for the polymer, α-olefins having 2-6 carbon atoms, such as ethylene, propylene, isobutylene and the like and styrene, α-methylstyrene, vinylnaphthalene, acrylate, methacrylate, acrylonitrile, methacrylonitrile, vinylidene chloride, methyl vinyl ketone, butyl vinyl ether, vinylcarbazole, vinylfuran, vinylpyridine and the like can be used. Ethylene, propylene, isobutylene, styrene and acrylonitrile are preferable. The molecular weight of the homopolymers or copolymers is about 100,000 to 1,000,000.

When the method of the present invention is carried out, the polymers are dissolved in an appropriate solvent. As the solvents, mention may be made of halogenated hydrocarbons, such as carbon tetrachloride, chloroform, methylene chloride; linear or cyclic ethers, such as diethyl ether, tetrahydrofuran and dioxane; aromatic hydrocarbons, such as xylene, toluene and benzene; paraffin series hydrocarbons, such as pentane, hexane and heptane and additionally, mention may be made of alcohols, acid anhydrides, esters and the like. The solvent need not be limited to these specifically enumerated materials. In addition, mixtures of solvents may be used. In general, the halogenated hydrocarbons are preferable and chloroform and methylene chloride are particularly preferable. The amount of solvent to be used has a relation to gelation in ozone-decomposition of said polymers and to the molecular weight distribution of the ozone-decomposition products. The concentration of the solution is preferred to be as low as possible and when a solution in which the amount of solvent is small and the concentration is high, is subjected to ozone-decomposition, gel occurs to a great extent and the ozone-decomposition products have a broad molecular weight distribution. For example, 100 g of 1,4-cis-polybutadiene is dissolved in 1.5 l of benzene or chloroform and the resulting solution is subjected to ozone-decomposition in the preparation of the polymer. In general, the concentration range is preferred to be about 0.1g/100ml – 50g/100ml and more particularly about 1g/100ml – 10g/100ml.

In the method of the present invention, the ozone to be used for the ozone-decomposition reaction is a mixed gas of ozone with a carrier gas, such as air or oxygen. The concentration of ozone in air or oxygen and the amount of ozone to be added can be selected optionally within a broad range and by varying these ozone conditions, the aldehyde functional polymers in which the molecular weight can be freely adjusted, can be produced through the ozone-decomposition of the polymer having a defined high molecular weight. The concentration of ozone has a close relation to gelation in the ozone-decomposition of said polymers and to the molecular weight distribution of the ozone-decomposition products and it is preferred to use a mixed gas having an ozone concentration as low as possible and when the ozone-decomposition is effected at a high ozone concentration, the generation of gel is high and the ozone-decomposition products have a broad molecular weight distribution. Namely, the concentration of the ozone based on a carrier gas is preferred to be about 0.1 to 0.5% by weight and more particularly about 0.1 to 0.2% by weight.

The ozone-decomposition is conducted by introducing the mixed gas containing ozone into the solution of the polymer in an appropriate solvent while stirring the solution.

The temperature of ozone-decomposition of the polymer is optionally selected within a range of about −80°C to +60°C, preferably about −30°C to +40°C and, more particularly, about −15°C to +20°C. In general, it is preferred that the temperature of ozone-decomposition be as low as possible but within a range of about −15°C to +20°C, no variation is observed in the activity of the ozone-decomposition products.

The ozone-decomposition rate varies depending upon the kind of double bond contained in the polymer and a —CH=CH— bond contained in the skeletal structure of the polymer is more difficulty ozone-decomposed than a $CR_2$=CH— bond projecting outwards from the skeletal structure as a side chain. That is, if the ozone-decomposition reaction of a polymer having a high content of $CR_2$=CH— double bond (vinyl bond) is carried out at a low temperature, the vinyl bond in the side chain is preferentially ozone-decomposed and the temperature of ozone-decomposition has an important relation to the adjustment of molecular weight of the ozone-decomposition products. The time of the contact reaction of the polymer with the ozone has a close relation to the desired molecular weight and the time is generally within a range of 0.5 to 24 hours.

The solvent to be used for reducing the ozone-decomposition products by means of a reducing agent into aldehyde functional group may be any one which can dissolve the ozone-decomposition products and further can be used in the ozone-decomposition reaction and can allow the reduction reaction to proceed smoothly. Namely, the solvent which has been used for the ozone-decomposition reaction, is used as it is but the solvent after the ozone-decomposition reaction may be evaporated and an appropriate solvent or mixed solvent can be freshly used.

The temperature for the reduction reaction varies depending upon the reducing agent to be used but is generally within a range of about −20°C to +100°C.

Heretofore, various reduction reactions for converting a product obtained by subjecting double bonds to ozone-decomposition into aldehyde groups are well known but the most preferable reducing agents for the ozone-decomposition products of high polymer according to the present invention are the trivalent phosphorus compounds. That is, a reduction in which a trivalent phosphorus atom is oxidized into pentavalent phosphorus atom by active oxygen, is utilized.

The trivalent phosphorus compounds to be used in the present invention are shown by the following general formulae.

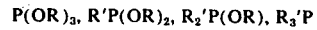

wherein R and R' are alkyl or aryl groups.

The trivalent phosphorus compounds shown by the general formula $P(OR)_3$ are the phosphites, for example, trimethyl phosphite, triethyl phosphite and triphenyl phosphite.

The trivalent phosphorus compounds shown by the general formula $R_3'P$ are the phosphines, for example, tributyl phosphine, trioctyl phosphine and triphenyl phosphine.

The trivalent phosphorus compounds shown by the general formulae $R'P(OR)_2$ and $R_2'P(OR)$ are, for example, phenyldiethoxy phosphine and diphenylethoxy phosphine. In the method of the present invention, among the trivalent phosphorus compounds, the phosphines and the phosphites are preferably used and particularly triphenylphosphine and lower trialkyl phosphites, such as triethyl phosphite, are preferable and among them, triphenylphosphine is most preferable considering the step of purification.

The reducing agent is generally used in an excess amount per equivalent of the ozone-decomposition products, that is from about 0.5 to 3.0 mol, preferably about 1.2 to 2.0 mol.

An explanation will be made as one embodiment of the method of the present invention with respect to the reduction of the ozone-decomposition products dissolved in a halogenated hydrocarbon or a paraffin series hydrocarbon by using triphenylphosphine as a reducing agent.

A solution of an excess amount of triphenylphosphine dissolved in chloroform is added to a solution of the ozone-decomposition products at room temperature. The reaction temperature and time may be optionally selected but the reaction temperature is generally about −20°C to 100°C and at room temperature, the reaction mixture is generally left to stand for a few days, while when the reaction mixture is stirred and circulated at 50°C to 100°C, the reduction reaction is completed quantitatively in a few hours. After the reaction is completed, the solvent is evaporated and the aldehyde functional polymers are dissolved and an appropriate solvent which does not dissolve possibly the unreacted excess triphenylphosphine and triphenylphosphine oxide is added. For example, when n-hexane of the paraffin series hydrocarbon is used, triphenylphosphine is soluble but phosphine oxide is insoluble and precipitates. This precipitate is filtered off and the solvent is evaporated to a certain degree to obtain a solution of the aldehyde functional polymer in a high concentration, which is stirred and mixed in a large amount of methanol and the resulting product is precipitated and purified. In general, the crude aldehyde functional polymer produced by using a trivalent phosphorus compound as a reducing agent is purified by a conventional reprecipitation purification using an alcohol. However, in order to prevent a reaction of the hydroxyl group of the alcohol used in precipitating the aldehyde functional polymer with the aldehyde in the resulting products, it is preferable to effect the purification rapidly at a temperature lower than room temperature. In special cases such as manufacturing fire-retardant materials, however, the crude aldehyde functional polymer produced may be used without further purification to take advantage of the phosphorus compounds included in the polymer as impurity, unless the succeeding reaction to produce material will be prevented to proceed by them.

The aldehyde functional group of the aldehyde functional polymer produced in the present invention was ascertained using the infrared absorption spectrum and analysed quantitatively by the silver oxide oxidation method (J. Mitchell, Jr. and D. M. Smith, *Anal. Chem.*, 22, 746 (1950)). The carboxyl group of the polymer was ascertained by the infrared absorption spectrum and analysed quantitatively by the neutralization titration method with sodium hydroxide in benzene-methanol. Whether hydroxyl groups were contained in the polymer or not was examined by the infrated absorption spectrum. As the result, it was confirmed that in the aldehyde functional polymer obtained by the reduction of the ozone-decomposition products according to the method of the present invention, substantially all the functional groups were aldehyde groups.

The following examples are given for the purpose of illustration of this invention and are not intended to be interpreted as limitations thereof.

EXAMPLE 1

Into a three neck flask of 3 l capacity equipped with a motor-driven stirrer and a Dewar condenser were charged 100 g of cis-1,4-polybutadiene and 1.5 l of chloroform to prepare a homogeneous rubber solution. Ozone was introduced into the flask at room temperature through a Kinoshita type glass ball filter while stirring the solution vigorously. Ozone was generated by introducing oxygen into an O-I-Z type ozone generator made by the Nippon Ozone Co., and introduced into the flask together with oxygen to effect the ozone-decomposition reaction under such conditions that the oxygen flow rate was 2.5 l/min and the ozone content in the oxygen was kept initially at 2 mg/l for 2 hours and then at 10 mg/l for 6 hours, whereby 9.6 g of ozone in total was introduced. Then the reaction solution was wholly bubbled with dry nitrogen for 30 minutes at a rate of 5 l/min to remove the oxygen. Immediately, 300 ml of a chloroform solution containing 80 g of triphenylphosphine was added dropwise to the above bubbled solution containing the ozone-decomposition products by means of a dropping funnel equipped with a pressure balancing side tube, and the resulting mass was left to stand for 24 hours at room temperature, after which the mass was refluxed at 60°C to 70°C for 2 hours with stirring, and then cooled to room temperature. The majority of the chloroform was evaporated by means of a rotary evaporator to obtain a viscous crude aldehyde functional polymer. The crude polymer was reprecipitated and purified using hexane-methanol in a conventional manner, and dried to obtain 49.0 g of a purified aldehyde functional polymer.

The results of the quantitative analysis of the aldehyde functional groups and carboxyl groups of the polymers obtained in this Example 1 and the following Examples 2–5 are summarized in the following Table 1.

As can be seen from the results contained in Table 1, the aldehyde functional polymer obtained in this Example 1 contains 0.883 meq/g of aldehyde functional groups and a negligibly small amount of 0.0020 meq/g of carboxyl groups. This shows that the polymer has substantially only aldehyde functional group.

EXAMPLE 2

In the same manner as described in Example 1, cis-1,4-polybutadiene was subjected to the ozone-decomposition reaction in a dry ice-acetone bath under the condition that the oxygen flow rate was 2.5 l/min and the ozone content in the oxygen was kept initially at 2 mg/l for 1 hour, then at 8 mg/l for 1 hour and further at 10 mg/l for 4 hours, whereby 7.5 g of ozone in total was introduced. Then, 100 g of triphenylphosphine was added to the reaction solution, and the resulting mass was left to stand for 3 days at room temperature to reduce the ozone-decomposition products. The resulting viscous crude reaction product was reprecipitated and purified in a conventional manner, and dried to obtain 77.4 g of a purified aldehyde functional polymer.

As can be seen from the results contained in Table 1, the quantitative analysis shows that the aldehyde functional polymer obtained in this Example 2 contains 0.595 meq/g of aldehyde functional groups and a negligibly small amount of 0.0069 meq/g of carboxyl groups.

EXAMPLE 3

In the same manner as described in Example 1, 100 g of cis-1,4-polybutadiene was dissolved in 2 l of benzene, and subjected to ozone-decomposition at room temperature under the condition that the oxygen flow rate was 2.5 l/min and the ozone content in the oxygen was kept initially at 2 mg/l for 30 minutes and then at 8 mg/l for 4 hours, whereby 5.0 g of ozone in total was introduced. Then, 200 ml of a benzene solution containing 50 g of triphenylphosphine was added to the reaction solution, and the resulting mass was left to stand for 24 hours and then heated at 80°C for 2 hours to reduce the ozone-decomposition products. The resulting crude polymer was purified by reprecipitation and dried to obtain 90.2 g of an aldehyde functional polymer.

The results of the quantitative analysis of the polymer are shown in Table 1.

EXAMPLE 4

In the same manner as described in Example 1, 100 g of cis-1,4-polybutadiene was dissolved in a mixed solvent composed of 1.5 l of benzene and 0.2 l of methanol, and subjected to ozone-decomposition in a water bath kept at 20°C under the conditions that oxygen, having an ozone content of 2 mg/l, was introduced at a flow rate of 2.5 l/min for 5 hours, whereby 1.5 g of ozone in total was introduced. Then, 100 ml of a benzene solution containing 10 ml of triethyl phosphite was added to the reaction solution, and the resulting mass was left to stand for 1 hour at room temperature, heated at 80°C for 1 hour and then left to stand for 24 hours at room temperature. The resulting product was purified by reprecipitation and dried to obtain 103.2 g of an aldehyde functional polymer.

The results of the quantitative analysis are shown in Table 1.

EXAMPLE 5

In the same manner as described in Example 1, 100 g of cis-1,4-polybutadiene was dissolved in 1.5 l of benzene and subjected to ozone-decomposition in a water bath kept at 20°C under the conditions that oxygen, having an ozone content of 2 mg/l, was introduced at a rate of 2.5 l/min for 3.3 hours, whereby 1.0 g of ozone in total was introduced. Then, 100 ml of a benzene solution containing 1.5 g of triphenylphosphine was added to the reaction solution, and the resulting mass was heated at 80°C for 1 hour and then left to stand for 24 hours at room temperature. The resulting product was purified by reprecipitation and dried to obtain 120.0 g of an aldehyde functional polymer.

Results of the quantitative analysis are shown in Table 1.

Table 1

| Quantitative Analysis of Functional Groups of Aldehyde Functional Polymer | | | | | |
|---|---|---|---|---|---|
| Example No. | 1 | 2 | 3 | 4 | 5 |
| Aldehyde group[1] (meq/g×10⁻¹) | 8.83 | 5.95 | 4.93 | 4.45 | 2.79 |
| Carboxyl group[2] (meq/g×10⁻³) | 2.0 | 6.9 | 5.5 | 2.4 | 7.5 |

[1] Oxidation with silver oxide (Potentiometric titration using a glass-calomel electrode). (J. Mitchell, Jr. and D.M. Smith, Anal. Chem., 22, 746 (1950).
[2] Neutralization titration with 0.1N-NaOH is a benzene-methanol solution (Potentiometric titration using a glass-calomel electrode).

EXAMPLE 6

In the same manner as described in Example 1, 50 g of vinyl-1,2-polybutadiene (trade mark: FCR-1261, made by Firestone Co., content of vinyl-1,2 unit: 87 mol%, number average molecular weight: about 20,000) was dissolved in 2 l of chloroform to prepare a homogeneous rubber solution, which was subjected to ozone-decomposition in an ice-methanol bath kept at −10°C by introducing 1.20 g (0.025 mol) of ozone in such a manner that oxygen, having an ozone content of 2 mg/l was introduced at a rate of 2.5 l/min for 4 hours. Then, the reaction solution was bubbled wholly with dry nitrogen at a rate of 5 l/min for about 30 minutes to remove the oxygen. Immediately, 100 ml of a chloroform solution containing 9.84 g (0.0375 mol, 1.5 times on a molar basis based on the amount of ozone introduced) of triphenylphosphine was added dropwise to the above bubbled solution containing the ozone-decomposition products by means of a dropping funnel equipped with a pressure balancing side tube. The resulting mass was left to stand overnight at room temperature and then heated and refluxed at 60°C to 70°C for 2 hours with stirring to complete the reduction of the ozone-decomposition products. Then, the reaction solution was cooled to room temperature, and the chloroform was evaporated by means of a rotary evaporator to obtain a viscous crude aldehyde functional polymer, which was then dissolved by adding 200 ml of n-hexane thereto. The resulting solution was left to stand for 2 days at room temperature, and further for 2 days in a refrigerator. After the deposited triphenylphosphine oxide was filtered off and washed with 300 ml of n-hexane, the filtrate and the washing were gathered and evaporated by means of a rotary evaporator to obtain 49.9 g of a viscous aldehyde functional polymer.

The nuclear magnetic resonance absorption spectrum of the thus obtained aldehyde functional polymer at 100 Mc in 20% by weight solution in deuterochloroform was measured at room temperature using tetramethylsilane as an internal standard. As the result, it was found that traces of triphenylphosphine and triphenylphosphine oxide were present and the equivalent molecular weight was determined to be 3,300 from the strength of proton at 9.8 ppm assigned to the aldehyde group. While, the theoretical molecular weight of the polymer calculated from the amount of ozone introduced was 8,600. Accordingly, the number of aldehyde functional groups in the polymer was 2.6. Further, a very small amount of protons assinged to the aromatic nuclei of triphenylphosphine and triphenylphosphine oxide were observed. In the infrared absorption spectrum of the polymer, absorptions at 1,730 cm⁻¹ and 2,720 cm⁻¹ assigned to the aldehyde group were observed, absorptions at 1,710 cm⁻¹ and 2,650 cm⁻¹ assigned to the carboxyl group were not observed, the absorption assigned to the hydroxyl group was not observed, and absorptions at 990 cm$^{-1}$ and 910 cm$^{-1}$ assigned to the vinyl group were observed.

EXAMPLE 7

In the same manner as described in Example 1, 75 g of vinyl-1,2-polybutadiene (FCR-1261) was dissolved in 1 l of chloroform to prepare a homogeneous rubber solution, which was subjected to ozone-decomposition in an ice-methanol bath kept at −10°C by introducing 10.8 g (0.225 mol) in such a manner that oxygen, having an ozone content of 10.0 mg/l, was introduced at a rate of 2.5 l/min for 7.2 hours. Then, the reaction solution was wholly bubbled with dry nitrogen at a rate of 5 l/min for about 1 hour to remove the oxygen. Then, 300 ml of a chloroform solution containing 70.82 g (0.270 mol, 1.2 times mol based on the amount of ozone introduced) of triphenylphosphine was added dropwise to the above bubbled solution containing the ozone-decomposition products by means of a dropping funnel equipped with a pressure balancing side tube. The resulting mass was left to stand overnight at room temperature, heated and refluxed at 65°C for 2 hours with stirring and then cooled to room temperature. After the chloroform was evaporated by means of a rotary evaporator, the residue was shaken thoroughly together with a mixture of 130 ml of acetone and 25 ml of water, whereby the triphenylphosphine and triphenylphosphine oxide remaining were extracted and removed. Successively, acetone contained in the residue was removed at room temperature and under a reduced pressure, and then 100 ml of benzene was added to the residue to dissolve the residue. The resulting solution was subjected to an azeotropic distillation at 60°C to remove water. The resulting viscous aldehyde functional polymer was dissolved by further adding 100 ml of benzene, and after 100 g of anhydrous sodium sulfate was added to the solution, the resulting mass was allowed to stand for 4 days at room temperature to remove completely the remaining water. After filtration, benzene was removed from the filtrate by means of a rotary evaporator. When this evaporation was effected at 90°C to remove the solvents completely, 24 g of a waxy aldehyde functional polymer was obtained.

The resulting polymer began to fluidize at 90°C to 100°C. The nuclear magnetic resonance absorption spectrum of the polymer measured in the same manner as described in Example 6 showed that the polymer contained substantially no triphenylphosphine and triphenylphosphine oxide. The equivalent molecular weight of the polymer calculated from the absorption strength of aldehyde protons was 1263, while the theoretical molecular weight of the polymer calculated from the amount of ozone introduced was 2,200, and accordingly, the number of aldehyde functional groups of the aldehyde functional polymer obtained in this Example 7 was 1.72. Further, it was found from the infrared absorption spectrum of the polymer that the polymer did not change its structure during the after-treatment and purification.

While the invention has been described in detail and in terms of specific embodiments thereof, it will be apparent that various changes and modifications can be made therein without departing from the spirit and scope thereof.

What is claimed is:
1. Aldehyde functional polybutadiene having
   a. a molecular weight from 500 to 50,000;
   b. infrared absorption due to aldehyde functional groups at 1,730 cm$^{-1}$ and 2,720 cm$^{-1}$;
   c. proton absorption at 9.8 ppm in its nuclear magnetic resonance spectrum with tetramethylsilane as a standard in a 20% by weight solution in deuterochloroform; and
containing substantially only aldehyde functional groups at chain terminals and/or on the side chains of the molecule.

2. The aldehyde functional polybutadiene of claim 1, wherein from 0.279 to 0.883 MEQ/g of aldehyde functional groups are present.

3. The aldehyde functional polybutadiene of claim 2, wherein from 0.0020 to 0.0075 MEQ/g of carboxyl groups are present.

* * * * *